United States Patent
Fuchs et al.

(10) Patent No.: US 7,784,856 B2
(45) Date of Patent: Aug. 31, 2010

(54) DYNAMIC LOAD BEARING COMPOSITE FLOOR PAN FOR AN AUTOMOTIVE VEHICLE

(75) Inventors: John P. Fuchs, Farmington, MI (US); Erik Arthur Banks, Dearborn, MI (US); Elisabeth Jane Berger, Farmington Hills, MI (US); John D. Fickes, Brighton, MI (US); Dean Robert Oswald, Mississauga (CA); Peter H. Foss, Oxford, MI (US)

(73) Assignees: United States Council for Automotive Research, Southfield, MI (US); United States Materials Automotive Partnership, LLC, Southfield, MI (US)

( * ) Notice: Subject to any disclaimer, the term of this patent is extended or adjusted under 35 U.S.C. 154(b) by 0 days.

(21) Appl. No.: 12/351,354

(22) Filed: Jan. 9, 2009

(65) Prior Publication Data

US 2009/0179461 A1 Jul. 16, 2009

Related U.S. Application Data

(60) Provisional application No. 61/020,559, filed on Jan. 11, 2008.

(51) Int. Cl.
*B62D 25/20* (2006.01)

(52) U.S. Cl. .............................. 296/187.08; 296/184.1; 296/204

(58) Field of Classification Search ................... 442/6, 442/52, 232, 324, 246, 266, 378, 391; 296/65.03, 296/63, 65.05, 69, 65.06, 187.08, 184.1, 296/191, 193.07
See application file for complete search history.

(56) References Cited

U.S. PATENT DOCUMENTS

| | | | |
|---|---|---|---|
| 3,415,568 A | 12/1968 | Gugelot et al. | |
| 3,958,276 A | 5/1976 | Glausen | |
| 4,573,707 A | 3/1986 | Pabst | |
| 4,594,290 A | 6/1986 | Fischer et al. | |
| 5,772,276 A * | 6/1998 | Fetz et al. | 296/181.6 |
| 7,056,567 B2 | 6/2006 | O'Neill et al. | |
| 7,087,296 B2 | 8/2006 | Porter | |
| 2003/0062744 A1* | 4/2003 | Misaji et al. | 296/204 |
| 2003/0118806 A1 | 6/2003 | Schonebeck | |
| 2003/0151274 A1* | 8/2003 | Buisson et al. | 296/190.08 |
| 2004/0229019 A1* | 11/2004 | Tilton et al. | 428/172 |
| 2006/0084332 A1* | 4/2006 | Muschelknautz et al. | 442/6 |
| 2007/0114816 A1* | 5/2007 | Hoelzel et al. | 296/204 |
| 2007/0126264 A1* | 6/2007 | Mizuma et al. | 296/204 |

FOREIGN PATENT DOCUMENTS

WO 2006027482 A1 3/2006

\* cited by examiner

*Primary Examiner*—Patricia L Engle
*Assistant Examiner*—SunSurraye Westbrook
(74) *Attorney, Agent, or Firm*—Brooks Kushman P.C.

(57) ABSTRACT

A composite floor pan may be joined with other structural members of an automotive vehicle. External loads imparted to the structural members may be transferred to the floor pan. The floor pan may be configured to absorb and/or transfer these external loads without separating.

19 Claims, 3 Drawing Sheets

DYNAMIC LOAD BEARING COMPOSITE FLOOR PAN FOR AN AUTOMOTIVE VEHICLE

CROSS-REFERENCE TO RELATED APPLICATION

This application claims the benefit of U.S. Provisional Application No. 61/020,559, filed Jan. 11, 2008.

BACKGROUND

1. Field of the Invention

Embodiments of the invention relate to dynamic load bearing composite floor pans for automotive vehicles.

2. Discussion

Plastics may be used in vehicle floor pans. WO 2006/027482 to Perret et al. provides a plastic material that can be used for producing such floor pans. The material is composed of a plastic material and of a reinforcing fiber fabric embedded in the plastic material. The fibers of the fabric and the plastic material are selected in such a manner that when the material is not stressed, the fibers are joined to the material, and that once the material is subjected to a certain level of stress, the fibers separate from the material over a certain length without breaking.

U.S. Pat. Pub. 2007/0114816 to Hoelzel et al. provides an undercarriage liner made of plastic for a vehicle that is detachably attached to an adjacent vehicle chassis. The undercarriage liner, in the form of a sandwich structure, has a lightweight core layer of polypropylene foam or unconsolidated glass-mat-reinforced thermoplastic. The core layer is provided with a thin cover layer of polypropylene fiber-reinforced polypropylene on both sides. The two rigid and high-impact cover layers are each thermally bonded to the core layer.

Composite materials may have multiple layers. U.S. Pat. Pub. 2003/0118806 to Schonebeck provides a composite component for vehicle bodies which has a firm outer skin and a plastic layer expanded in a foaming form against the interior of the outer skin. A reinforcing layer is formed against the interior of the plastic layer which is held at a defined distance in the foaming form by the outer skin.

U.S. Pat. No. 7,087,296 to Porter provides multi-layered composites, laminates and composite joints in which at least one resin-impregnated, fiber-containing layer is joined or laminated to a core layer having a lower flexural modulus or higher elongation at break, higher toughness, or a combination of all or some of these properties.

SUMMARY

A body-frame integral automotive vehicle may include a pair of engine compartment rails, a pair of rocker panel assemblies, a dash panel and a multi-layered composite floor pan. The floor pan may be (i) attached with the engine compartment rails, rocker panel assemblies and dash panel and (ii) configured to absorb or transfer dynamic external loads imparted to any of the engine compartment rails, rocker panel assemblies and dash panel while maintaining structural integrity.

A multi-layered composite automotive floor pan may be configured to absorb or transfer, without separating, dynamic external loads imparted to the automotive floor pan.

An automotive multi-layered composite floor pan may have an ultimate strain capability at least 50% greater than the floor pan's strain at ultimate stress.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

A composite floor pan may be joined with other structural members of an automotive vehicle. External loads imparted to the structural members may be transferred to the floor pan. The floor pan may be configured to absorb and/or transfer these external loads without separating. The floor pan may have a multi-layered structure including a high elongation fabric core sandwiched between reinforcing fiber fabrics.

Figure 1:
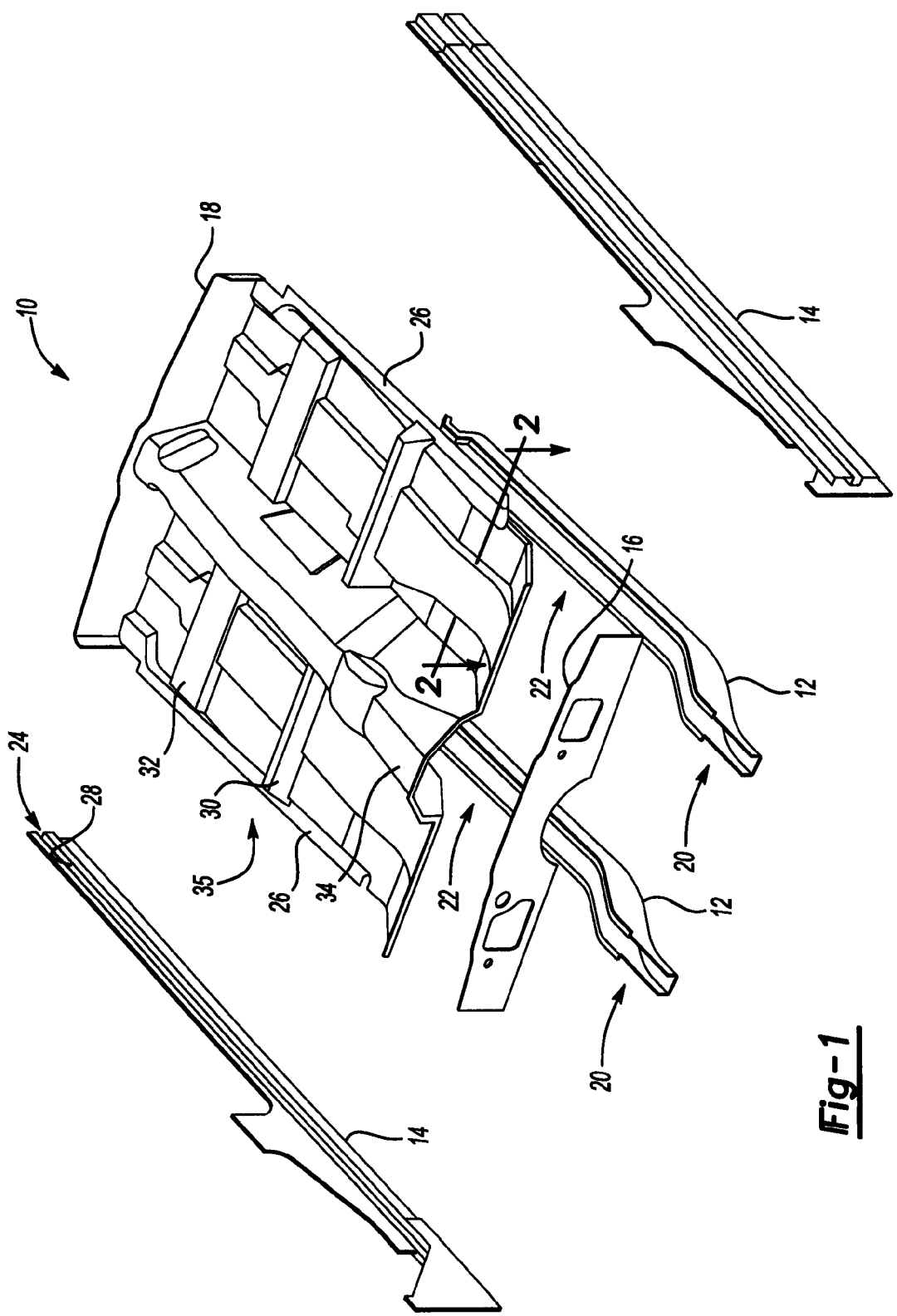
FIG. 1 is an exploded assembly view of structural members of an automotive vehicle according to an embodiment of the invention.

Referring now to FIG. 1, structural members 10 form a portion of an automotive vehicle having a body-frame-integral architecture. The structural members 10, in the embodiment of FIG. 1, include engine compartment rails 12, rocker panel assemblies 14, a dash panel 16 and composite floor pan 18. Other arrangements, however, are also possible.

The engine compartment rails 12 may be U-shaped, stamped steel members optimized for stiffness and weight. In other embodiments, the engine compartment rails 12 may be extruded or drawn, may be made from any suitable material and take any suitable shape. Respective front ends 20 of the engine compartment rails 12 are joined, e.g., welded, etc., with an engine compartment of the vehicle (not shown). Leg portions 22 of the engine compartment rails 12 are joined, e.g., adhesively bonded, mechanically fastened, weld bonded, etc., with a bottom of the composite floor pan 18.

The rocker panel assemblies 14 may be each formed from a collection of stamped steel components welded together. In other embodiments, the rocker panel assemblies 14 may be formed from a single stamping, may be made from any suitable material and take any suitable shape. The corrugated profile of the rocker panel assemblies 14 assists in achieving desired weight and stiffness objectives. Channels 24 in each of the rocker panel assemblies 14 receive respective flanges 26 of the composite floor pan 18. The flanges 26 are joined, e.g., weld bonded, bonded, mechanically fastened, etc., with respective ledges 28 of the channels 24.

The dash panel 16 in the embodiment of FIG. 1 is made from stamped steel and joined with a front of the composite floor pan 18. In other embodiments, the dash panel may be made from any suitable material, including a composite, and take any suitable shape.

The rocker panel assemblies 14, dash panel 16 and floor pan 18 partially define a cabin 35 of the vehicle. Seats and other interior components (not shown) may be mounted on the floor pan 18 during vehicle assembly.

The composite floor pan 18 in the embodiment of FIG. 1 includes cross-vehicle beam portions 30, 32 that extend between the rocker panel assemblies 14 and into the cabin 35. The cross-vehicle beam portions 30, 32 improve the stiffness and rigidity of the composite floor pan 18. In other embodiments, a fewer or greater number of cross-vehicle beam portions may be included. The composite floor pan 18 also includes a portion 34 defining a tunnel that extends between a front and rear of the vehicle. The portion 34 accommodates a driveline (not shown) associated with the vehicle.

The structural members 10 form an integrated primary structure for the vehicle. That is, if a front end of the vehicle is subjected to dynamic external loads, i.e., loads generated during vehicle impact at speeds from 10 m.p.h. to 40 m.p.h., a significant portion of the loads imparted to the engine compartment rails 12 will be transferred to the composite floor pan 18. The composite floor pan 18 will absorb and/or transfer these loads to other of the structural members 10 while maintaining structural integrity, i.e., without separating and while maintaining cabin integrity. If a side of the vehicle is subjected to dynamic external loads, a significant portion of the loads imparted to the rocker panel assemblies 14 will be transferred to the composite floor pan 18. Again, the composite floor pan 18 will absorb and/or transfer these loads without separating and while maintaining cabin integrity. A similar discussion applies if a rear end of the vehicle is subjected to dynamic external loads. As such, the composite floor pan 18 is arranged and configured to carry dynamic loads while maintaining its structural integrity and vehicle system stiffness.

Figure 2:
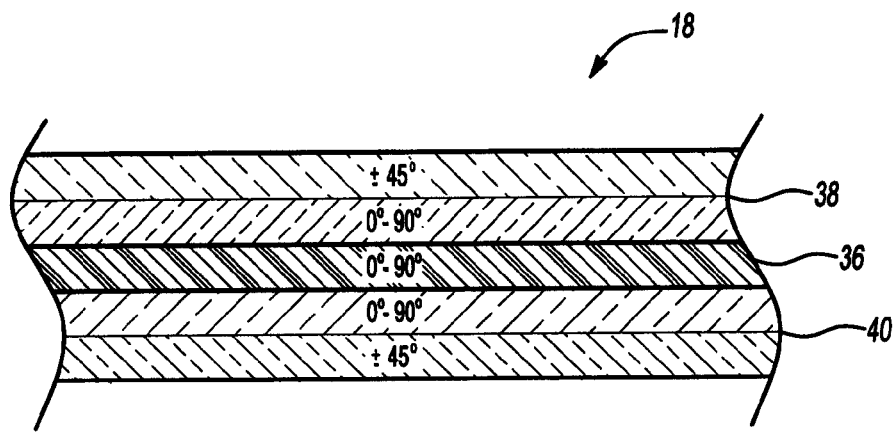
FIG. 2 is a side view, in cross-section, of the floor pan of FIG. 1 taken along line 2-2 of FIG. 1.

Referring now to FIG. 2, the composite floor pan 18 has a multi-layer structure. A 1-ply, low-density (e.g., specific gravity less than 1.5), high elongation (e.g., tensile strain capability greater than 5%) fabric 36, such as high-modulus polypropylene (HMPP) or DuPont's SORONA fabric, is sandwiched between 2-ply, glass-fiber fabrics 38, 40. Of course, other high elongation materials, such as a metal screen or an elastomeric film, may be used instead of the fabric 36. The fiber reinforcement of layers 38, 40 may be carbon, aramid or another fiber in addition to/instead of glass fiber. The resin may be either a thermoplastic or a thermoset.

The 1-ply, low density, high elongation fabric 36 has a thickness of 1.1 mm and a 0°-90° fabric orientation. The 2-ply, glass-fiber fabrics 38, 40 each have a thickness of 1.5 mm and 0°-90°, ±45° fabric orientations. In other embodiments, the thickness of the fabric 36 may range, for example, from 0.2 mm-3.0 mm while the thickness of the fabrics 38, 40 may range, for example, from 1.0 mm-5.0 mm. Other thicknesses and fabric orientations are also possible.

Figure 3:
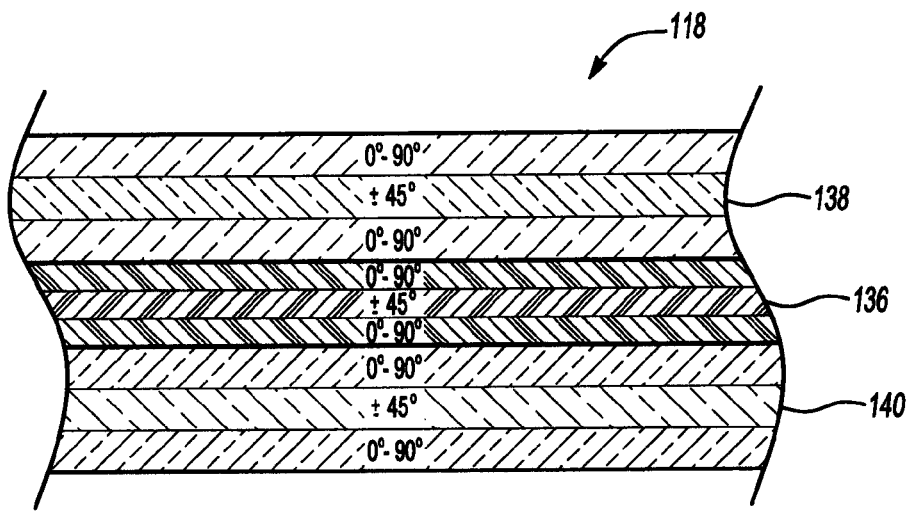
FIG. 3 is a side view, in cross-section, of a floor pan according to another embodiment of the invention.

Referring now to FIG. 3, the composite floor pan 118 has a multi-layer structure (where like numerals have similar descriptions to the numbered elements of FIG. 2). A 3-ply, low-density, high elongation fabric 136 is sandwiched between 3-ply, glass-fiber fabrics 138, 140. The 3-ply fabric 136 has a thickness of 1.2 mm and 0°-90°, ±45°, 0°-90° fabric orientations. The 3-ply, glass-fiber fabrics 138, 140 each have a thickness of 1.5 and 0°-90°, ±45°, 0°-90° fabric orientations. The 3-ply fabric 136 is positioned at a midline of the multi-layer structure to minimize warping and/or buckling, and to promote symmetric loading throughout the floor pan 118 for superior load distribution. The 3-ply fabric 136, however, may be positioned off-midline if required.

Figure 4:
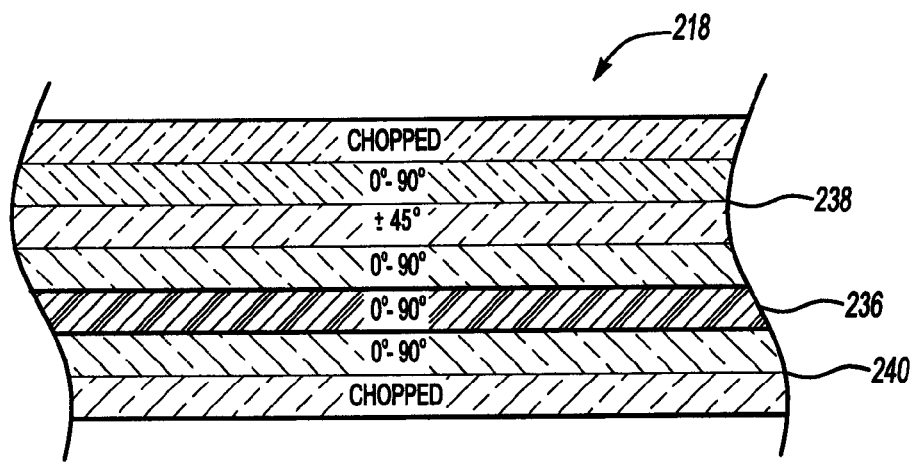
FIG. 4 is a side view, in cross-section, of a floor pan according to yet another embodiment of the invention.

Referring now to FIG. 4, the composite floor pan 218 has a multi-layer structure (where like numerals have similar descriptions to the numbered elements of FIG. 2). A 1-ply, low-density, high elongation fabric 236 is sandwiched between a 4-ply glass-fiber fabric 238 and a 2-ply glass-fiber fabric 240. The 1-ply fabric 236 has a 0°-90° fabric orientation. The 4-ply glass-fiber fabric 238 has 0°-90°, ±45°, 0°-90° fabric orientations and includes a ply of chopped glass fibers. The 2-ply glass-fiber fabric 240 has a 0°-90° fabric orientation and includes a ply of chopped glass fibers. Other layer, ply arrangement and fabric orientations are also possible.

Figure 5:
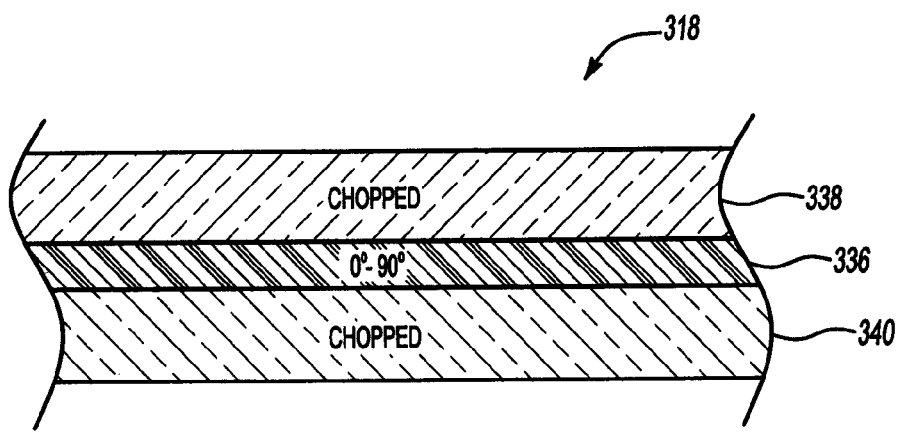
FIG. 5 is a side view, in cross-section, of a floor pan according to still yet another embodiment of the invention.

Referring now to FIG. 5, the composite floor pan 318 has a multi-layer structure (where like numerals have similar descriptions to the numbered elements of FIG. 2). A 1-ply, low-density, high elongation fabric 336 having a 0°-90° fabric orientation is sandwiched between chopped fiber-reinforced composites 338, 340.

Figure 6:
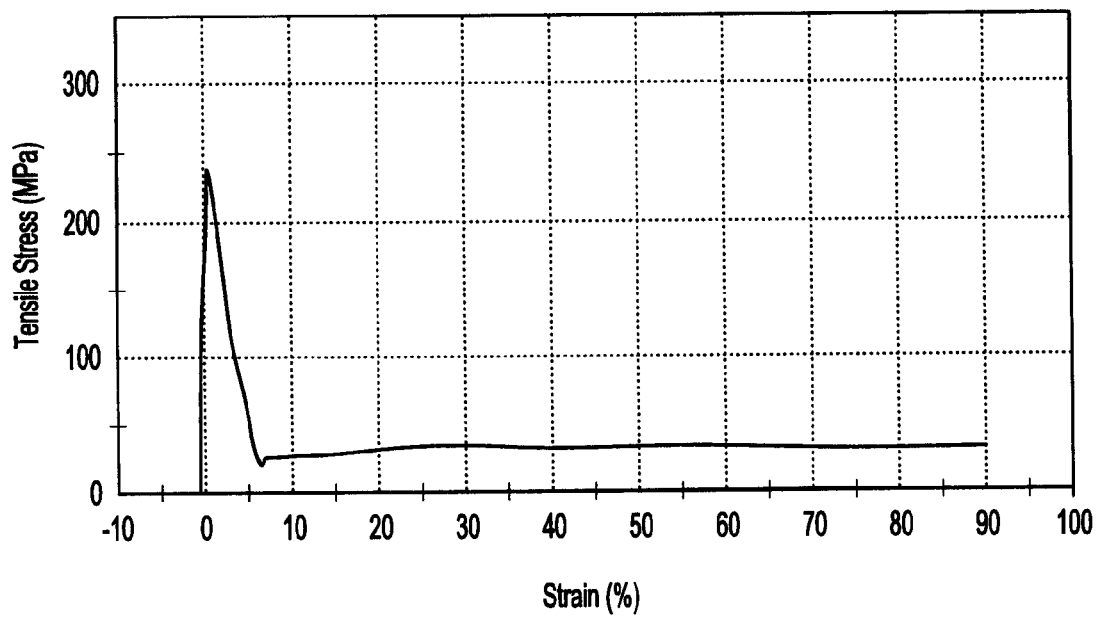
FIG. 6 is an example plot of strain versus tensile stress for a test specimen having a high elongation fabric core sandwiched between glass-fiber fabrics.

Referring now to FIG. 6, a tensile test specimen having a structure similar to the floor pans 18, 118, 218, 318 continues to build tensile stresses up to a maximum of approximately 240 MPa. At a strain of approximately 2% (the strain at maximum stress, in this example) the glass-fiber fabrics are compromised and the tensile stress drops to approximately 45 MPa for strains up to 90% (the ultimate strain, in this example). In other examples, the ultimate strain may be at least 1.5 times the strain at maximum stress. The high elongation core of the structure allows the test specimen to carry loads at relatively high strains.

Several techniques may be used to manufacture floor pans similar to those discussed with reference to FIGS. 1-5. As an example, sheet molding compound (SMC) is in-line compounded using glass fabric as reinforcement. Additional chopped glass may be added in addition to (or instead of) the glass fabric. SMC charges are cut to shape and stacked to form the appropriate number of plies of a glass layer. A layer of high elongation core material, e.g., HMPP, is placed on top of the glass layer. Additional SMC charges are cut to shape and stacked on top of the core material to form the appropriate number of plies of an additional glass layer, usually developing a symmetric stack pattern about the high elongation material. The completed stack is placed into a compression tool. The tool applies pressure to form the floor pan.

As another example, direct long fiber thermoplastic (DLFT) processes may be used. A thermoplastic resin, which may be polypropylene, polyamide, or another thermoplastic material, is mixed with chopped reinforcing fibers in an extruder. A charge is extruded and placed in a compression mold. The mold is then closed and the part formed.

To form certain of the sandwich composite structures described herein, a high elongation core may be added to chopped fiber/thermoplastic composite by setting a surfacing veil on a pre-form station, heating the high elongation core (or other fabric) in an oven, extruding two DLFT charges, rapidly placing one DLFT charge on the veil (or in the tool), layering the hot core material onto the DLFT charge, layering the second DLFT charge onto the core material, transferring this sandwich into the compression mold and closing the mold. This may be done either manually or robotically, with care being taken to make sure the material is transferred to the compression mold (and the mold closed) before the material cools.

As yet another example, a semi-finished sheet, which may be reinforced with either chopped fibers or fabric, may be heated in an oven, layered with a pre-heated high elongation core, transferred to a compression mold, and the mold closed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A body-frame integral automotive vehicle including a cabin, the vehicle comprising:
   a pair of engine compartment rails; a pair of rocker panel assemblies;
   a dash panel;
   a multi-layered composite floor pan (i) defining at least a portion of the cabin, (ii) attached with the engine compartment rails, rocker panel assemblies and dash panel and (iii) configured to absorb or transfer dynamic external loads generated during vehicle impact at speeds from 10 m.p.h, to 40 m.p.h, and imparted to any of the engine compartment rails, rocker panel assemblies and dash panel without separating and while maintaining cabin integrity; and
   wherein the multi-layered composite floor an includes a fabric layer sandwiched between glass-fiber fabric layers, the fabric layer having a specific gravity less than 1.5 and a tensile strain capability greater than 5%.

2. The vehicle of claim 1 wherein the fabric layer has a thickness that ranges between 0.2 mm and 3.0 mm.

3. The vehicle of claim 1 wherein each of the glass-fiber fabric layers has a thickness that ranges between 1.0 mm and 5.00 mm.

4. The vehicle of claim 1 wherein the fabric layer comprises high-modulus polypropylene.

5. The vehicle of claim 1 wherein at least one of the glass-fiber fabric layers comprises a multi-ply glass-fiber fabric layer.

6. The vehicle of claim 5 wherein the multi-ply glass-fiber fabric layer includes a chopped glass-fiber ply.

7. The vehicle of claim 1 wherein the fabric layer is positioned at a mid-line of the multi-layered composite floor pan.

8. The vehicle of claim 1 wherein the multi-layered composite floor pan includes a fabric layer sandwiched between chopped fiber-reinforced composite layers, the fabric layer having a specific gravity less than 1.5 and tensile strain capability greater than 5%.

9. A multi-layered composite automotive floor pan configured to absorb or transfer, without separating, dynamic external loads imparted to the automotive floor pan.

10. The automotive floor pan of claim 9 including a fabric layer sandwiched between glass-fiber fabric layers, the fabric layer having a specific gravity less than 1.5 and a tensile strain capability greater than 5%.

11. The automotive floor pan of claim 10 wherein the fabric layer is positioned at a mid-line of the floor pan.

12. The automotive floor pan of claim 9 including a metal screen or elastomeric film sandwiched between glass-fiber fabric layers.

13. The automotive floor pan of claim 9 including a fabric layer sandwiched between chopped fiber-reinforced composite layers, the fabric layer having a specific gravity less than 1.5 and tensile strain capability greater than 5%.

14. An automotive multi-layered composite floor pan configured to have an ultimate strain capability at least 50% greater than the floor pan's strain at ultimate stress.

15. The multi-layered composite floor pan of claim 14 further configured to have an ultimate strain capability at least 90% greater than the floor pan's strain at ultimate stress.

16. The multi-layered composite floor pan of claim 14 including a fabric layer sandwiched between glass-fiber fabric layers, the fabric layer having a specific gravity less than 1.5 and a tensile strain capability greater than 5%.

17. The multi-layered composite floor pan of claim 16 wherein the fabric layer is positioned at a mid-line of the floor pan.

18. The multi-layered composite floor pan of claim 14 including a metal screen or elastomeric film sandwiched between glass-fiber fabric layers.

19. The multi-layered composite floor pan of claim 14 including a fabric layer sandwiched between chopped fiber-reinforced composite layers, the fabric layer having a specific gravity less than 1.5 and tensile strain capability greater than 5%.

* * * * *

UNITED STATES PATENT AND TRADEMARK OFFICE
CERTIFICATE OF CORRECTION

| | | |
|---|---|---|
| PATENT NO. | : 7,784,856 B2 | Page 1 of 1 |
| APPLICATION NO. | : 12/351354 | |
| DATED | : August 31, 2010 | |
| INVENTOR(S) | : John P. Fuchs et al. | |

It is certified that error appears in the above-identified patent and that said Letters Patent is hereby corrected as shown below:

Column 5, Line 18, Claim 1:

After "composite floor" delete "an" and insert -- pan --.

Signed and Sealed this
Twenty-first Day of June, 2011

David J. Kappos
*Director of the United States Patent and Trademark Office*

UNITED STATES PATENT AND TRADEMARK OFFICE
CERTIFICATE OF CORRECTION

PATENT NO. : 7,784,856 B2
APPLICATION NO. : 12/351354
DATED : August 31, 2010
INVENTOR(S) : John P. Fuchs Page 1 of 1

It is certified that error appears in the above-identified patent and that said Letters Patent is hereby corrected as shown below:

*Please add the following after the title: Col. 1*

STATEMENT REGARDING FEDERALLY SPONSORED RESEARCH OR DEVELOPMENT

The invention was made with Government support under Cooperative Agreement Nos. DE-FC26-02OR22910 and DE-EE0003583. The Government has certain rights to the invention.

Signed and Sealed this
Ninth Day of August, 2011

David J. Kappos
*Director of the United States Patent and Trademark Office*